United States Patent [19]

George

[11] 4,092,077
[45] May 30, 1978

[54] STRUCTURAL CONNECTOR

[75] Inventor: Henry Howard George, Louisville, Ky.

[73] Assignee: Chemetron Corporation, Chicago, Ill.

[21] Appl. No.: 739,006

[22] Filed: Nov. 4, 1976

Related U.S. Application Data

[63] Continuation of Ser. No. 581,135, May 27, 1975.

[51] Int. Cl.² .............................................. F16D 1/00
[52] U.S. Cl. ..................................... 403/178; 403/406
[58] Field of Search ............................... 403/169–172, 403/174, 176, 178, 205, 406, 217; 285/152, 155

[56] References Cited

U.S. PATENT DOCUMENTS

| | | | |
|---|---|---|---|
| 706,534 | 8/1902 | Dawson | 403/178 X |
| 1,408,675 | 3/1922 | Wimberg | 403/176 X |
| 1,872,048 | 8/1932 | Thomas | 285/155 X |
| 2,293,392 | 8/1942 | Herzog | 285/155 |
| 2,569,378 | 9/1951 | Hood | 285/155 X |
| 2,910,314 | 10/1959 | Klein | 403/174 |
| 3,445,129 | 5/1969 | Penote | 403/174 |
| 3,574,362 | 4/1971 | Gregg et al. | 285/423 X |

FOREIGN PATENT DOCUMENTS

| | | | |
|---|---|---|---|
| 545,887 | 6/1942 | United Kingdom | 403/178 |

Primary Examiner—Wayne L. Shedd

[57] ABSTRACT

Structural connector for tubular members used in trusses and the like comprises a one-piece forged element comprising at least a portion of a tubular primary member with a longitudinal central axis and a pair of first and second tubular secondary members integrally connected to one side of the principal member. The secondary members have longitudinal central axes coplanar with the axis of said portion of said primary member and the axes of the secondary members intersect each other at a point displaced to the same side of the axis of the primary member where the secondary members intersect one another.

7 Claims, 4 Drawing Figures

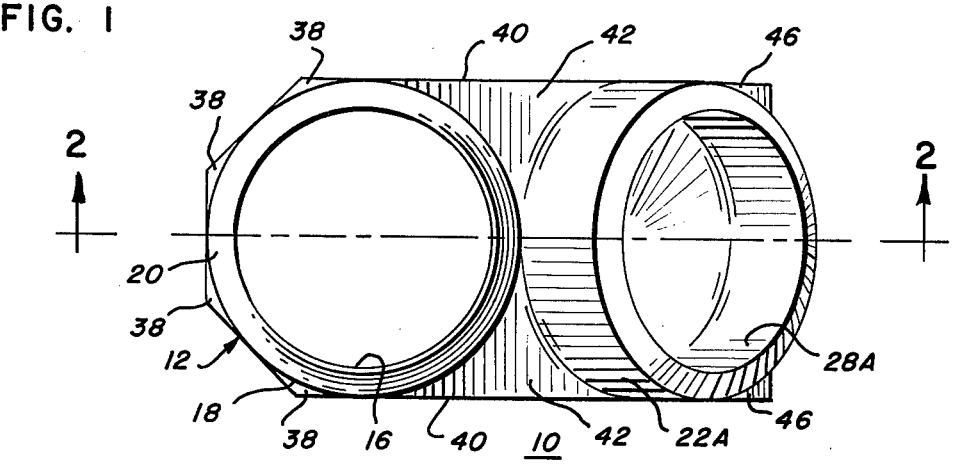
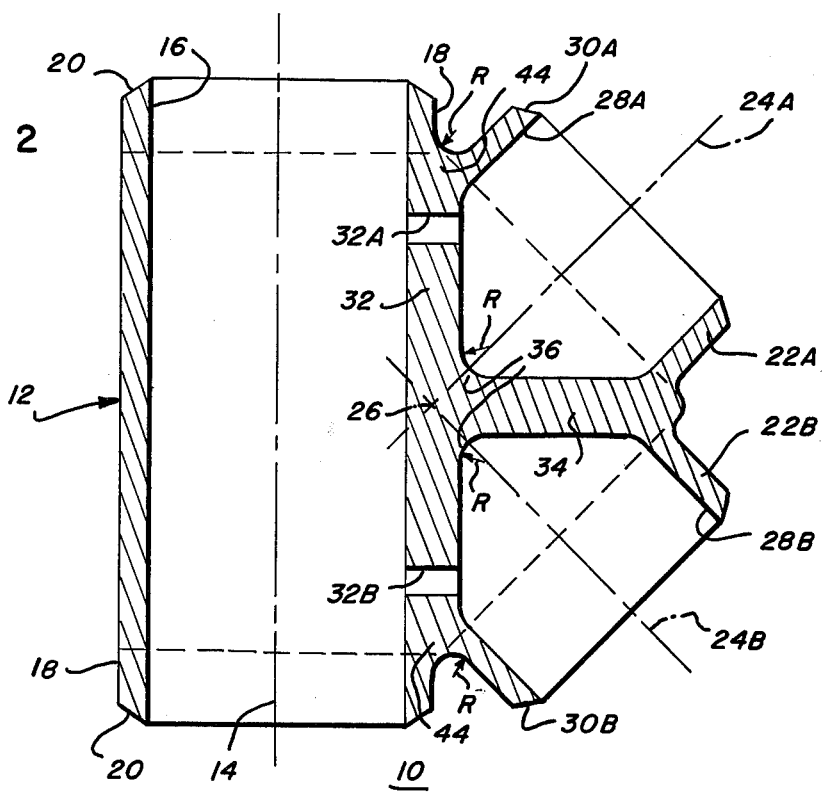

STRUCTURAL CONNECTOR

This is a continuation, of application Ser. No. 581,135, filed May 27, 1975.

The present invention relates to structural connectors for tubular members used in trusses and the like commonly provided for supporting off-shore drilling platforms, oil rigs, buildings and the like. With the increased emphasis of off-shore oil explorations throughout the world, an ever increasing market is developing for suitable structures for use in supporting the off-shore drilling rigs and production platforms. As off-shore oil exploration proceeds into deeper waters and more violent environmental conditions are encountered, the structures needed for supporting the production platforms and off-shore rigs must be capable of withstanding ever increasing loads and adverse weather factors.

A number of failures on structures supporting production platforms and off-shore rigs has occurred throughout the world during the last decade and the failure experience indicates that the failures often begin in the structural joint connectors which are used for interconnecting sections of the posts or braces and lateral cross-bracing members connected to the posts. The most commonly used structural members used in support structures of the character described are hollow tubular shapes of circular cross-section in contrast to H-beams, I-beams, channels and angles. Many of the oil rigs and production platforms are designed to be jacked up on their supporting structures and most commonly welded butt joint construction is used to add height to the supporting structure.

Failures of joint connectors are believed to initiate from fatigue and stress concentration in the joint connectors in the region where the sloping or horizontal cross-bracing members intersect the vertical member or post.

Most of the joint connectors utilized to date, have been of a welded construction and numerous failures are believed to have been the result of stress conditions in the metal because of the welding heat and the irregular external shape and high probability of incomplete penetration of the weld, as well as external reversible fatigue stresses caused by high winds, wave action and severe temperature gradients. Laminar tearing of the metal adjacent the areas of the welded joints in a direction parallel of the weld bead has occurred and this is believed to have resulted from internal stress developed during the welding process.

Some attempts have been made to provide a joint connector formed of cast metal in order to avoid the problems of laminar tearing and failure believed to have resulted from the strains caused by the heat of the welding process. However, because the shapes of the joint connectors are relatively complex and because the connectors are relatively large in size employing thick metal sections, casting are difficult and costly to produce and manufacturers are not capable of insuring that sound castings can be produced free of voids and faults. It is essential that such castings for joint connectors be sound in order to be suitable for use in the high stress and hostile environment that is prevalent in off-shore structures. It is therefore an object of the present invention to provide a new and improved joint connector for tubular members in a truss or the like as commonly utilized in off-shore structures for supporting drilling rigs, production platforms, and the like.

Another object of the present invention is to provide a new and improved one-piece joint connector formed from a metal billet in a forging process.

It is an object of the present invention to provide a new and improved forged metal joint connector of the character described employing a hollow tubular primary member and a pair of secondary tubular members integrally connected to intersect on one side of the primary member.

It is another object of the invention to provide a new and improved joint connector of the character described wherein the center axes of the secondary members intersect each other at a point displaced toward the side of intersection and spaced from the longitudinal central axis of the primary member.

Another object of the present invention is to provide a new and improved forged metal joint connector of the character having thickened wall sections in primary member adjacent the interconnection with the secondary members.

Yet another object of the present invention is to provide a new and improved forged metal joint connector of the character wherein a thickened wall section is provided directly between the intersection of the secondary members.

These and other objects and advantages of the present invention are accomplished in an illustrated embodiment comprising a structural joint connector for tubular members used in trusses and the like commonly used in off-shore support structures for oil rigs and production platforms. The joint connector comprises a one-piece forged metal element having a tubular primary member having a longitudinal central axis and a pair of first and second tubular secondary members integrally connected to one side of the primary member. Each of the secondary members has a longitudinal central axis coplanar with the axis of the primary member and the axes of the secondary members intersect one another at a point displaced outwardly of the axis of the primary member toward the side of the intersecting secondary members. Outer ends of the primary and secondary members are adapted to be butt welded to members and braces of the support structure in which the joint connectors are used.

For better understanding of the present invention, reference should be had to the following detailed description taken in conjunction with the claims in the drawings in which:

FIG. 1 is an end elevational view of a structural joint connector constructed in accordance with the features of the present invention;

FIG. 2 is a longitudinal cross-sectional view of the connector of FIG. 1 taken substantially along lines 2—2 thereof;

Figure 3:
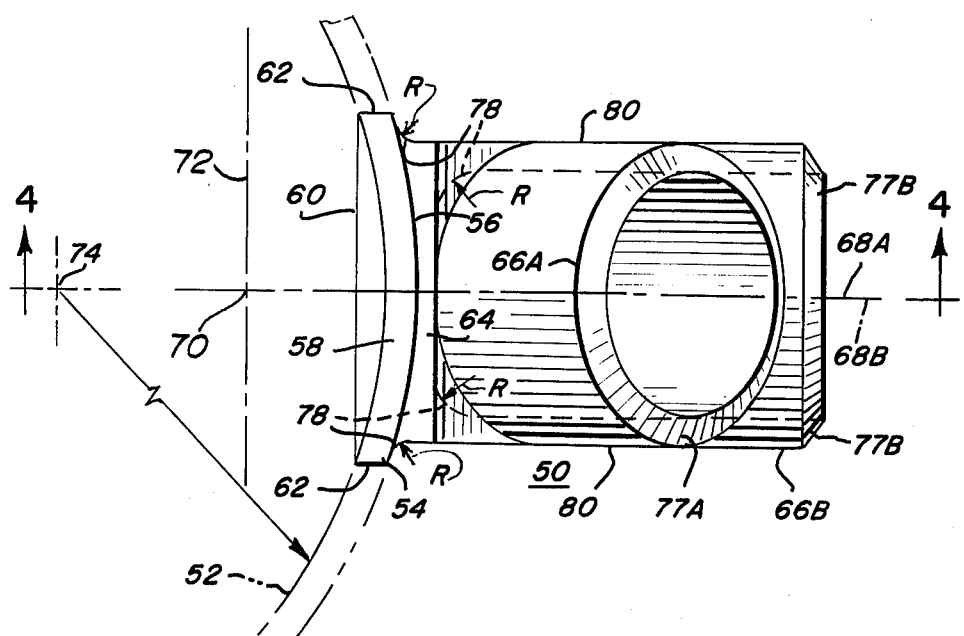
Figure 4:
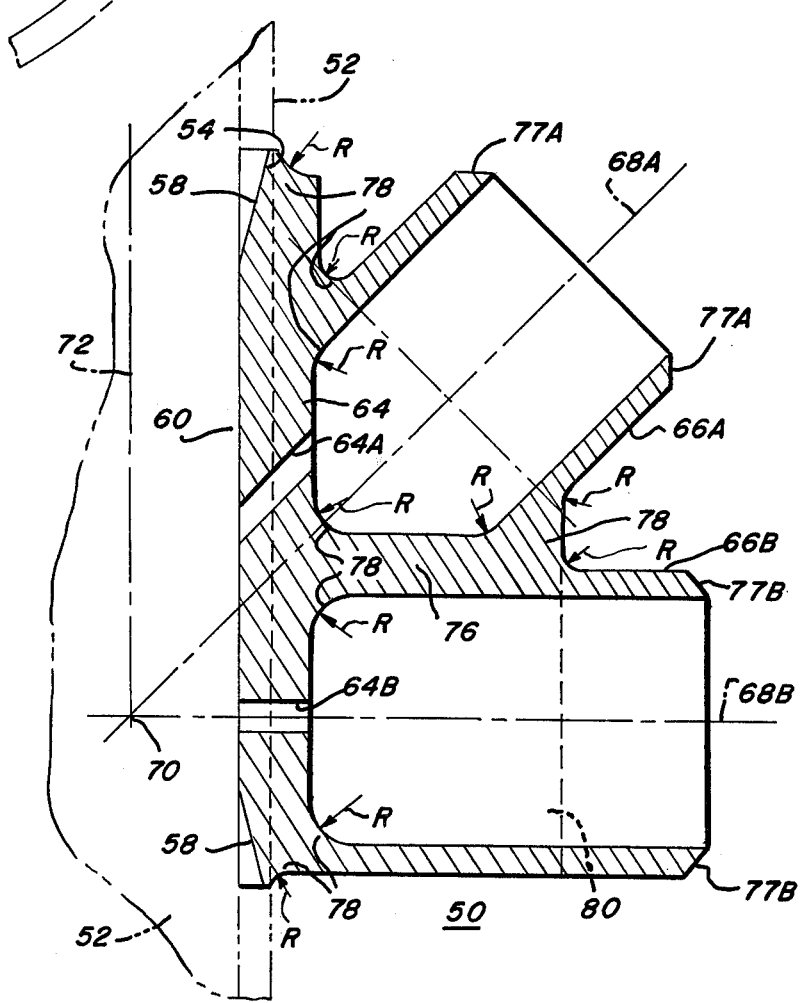

FIG. 3 is an end elevational view of another embodiment of a component of a structural joint connector in accordance with the features of the invention and shown with a fragmentary portion of the primary structural member in which the component is used illustrated in dotted lines; and FIG. 4 is a longitudinal cross-sectional view of the connector component of FIG. 3 taken substantially along lines 4—4 thereof.

Referring now more particularly to the drawings, in FIGS. 1 and 2 is illustrated a new and improved forged metal joint connector for use in interconnecting tubular cross-brace members in a truss or the like as commonly used in off-shore support structures for production platforms or oil rigs and the like. The forged metal joint connector is designated generally by the reference numeral 10 and is forged from a billet of steel or a particular class of alloy steel as required. The joint connector 10 includes an elongated, hollow tubular body or primary member 12 having a longitudinal axis 14 centered within the cylindrical surface of an axial bore 16 extending between opposite ends. The tubular body 12 is constructed with cylindrical, connector sections 18 at opposite ends having frustoconically beveled end surfaces 20 for facilitating a butt-welded joint between the joint connector and the elongated tubular elements such as braces or posts of the support structure in which the joint connector is used. The forged metal joint connector also includes a pair of tubular secondary members 22A and 22B respectively, each having a longitudinal central axis 24A and 24B respectively. As shown in FIG. 2, the secondary members are arranged to angularly intersect one another on one side (the inside) of the primary member 12 and the axes 24A and 24B intersect one another at a point 26 which is spaced from the axis 14 of the primary member toward the side of intersection of the secondary members. All three of the central axes 14 and 24A and 24B, are in coplanar relation on a longitudinal central plane through the connector as defined by the line 2—2 of FIG. 1.

The outer ends of the respective secondary tubular members 22A and 22B are provided with cylindrical wall sections 28A and 28B having frustoconically beveled outer end surfaces 30A and 30B, respectively, adapted to be butt-welded to hollow tubular brace elements of the supporting structure in which the joint connector is used.

In accordance with the present invention, the secondary members 22A and 22B directly intersect one another as opposed to being shaped apart like some prior art designs and this produces a point of intersection 26 at a location spaced inside the longitudinal axis 14 of the primary tubular body 12. Calculations have indicated that the efficiency of the joint connector 10 is greatly improved with this type of arrangement termed negative eccentricity in comparison with a joint wherein the center axes of the secondary members intersect at a point located on the longitudinal center axis of the primary tubular member 12, termed zero eccentricity. Moreover, in connectors where spacing is provided between the secondary tubular members 22A and 22B, the intersection point of their longitudinal axes 24A and 24B may well lie to the outside of the longitudinal center axis 14 of the tubular body 12 in a condition defined as positive eccentricity. Of the three types of eccentricity mentioned, the negative eccentricity is most efficient and the calculated joint efficiency for the zero and positive eccentricity types is lower.

The design of the present invention employs the negative eccentricity design with the point 26 of the intersecting axes 24A and 24B spaced on the inside of the longitudinal axis 14 of the tubular body 12 on the same side of the body or toward the intersecting secondary members 22A and 22B. The point of intersection 26 is spaced inside by a distance greater than the inside radius of the tubular bore 16 of the primary body 12 and an increased efficiency of the joint results therefrom and is confirmed by actual testing of the joint connectors.

In accordance with the present invention, the wall portion of the tubular body 12 adjacent the intersection of the secondary tubular members 22A and 22B is provided with a thickened cross-section indicated by the numeral 32 and this thickened cross-section in the region of intersection between the primary and secondary members provides for greatly reduced stress concentration in the most critical area of the joint connector. If required for a particular application, one or more openings 32A and 32B may be formed in the wall section 32 in order to provide interior communication between the primary and secondary members. These openings permit the interior of the tubular members to be flooded or filled with water when required to help submerge the connector for an underwater application. In addition to the thickened section 32 of the primary tubular body 12, the joint connector 10 includes a relatively thick web portion 34 integrally joined with and extending outwardly of the thick wall section 32. The web lies between the intersecting secondary tubular members 22A and 22B and provides additional stress reduction in another critical stress area of the joint connector. The point of junction of the web 34 and thickened wall section 34 is smoothly rounded with gussets 36 having a radius "R" at least equal to or greater than the wall thickness of the cylindrical connecting sections 28A and 28B of the respective secondary members and the end sections 18 of the primary tubular body 12. The web 34 between the intersecting secondary members is made thicker than the wall section of the cylindrical portions 28A and 28B of the respective secondary tubular members.

The amount of angular displacement between the axes 24A and 24B in relation to each other and in relation to the longitudinal axis 14 of the primary tubular body 12 vary as required by a particular joint connector application. In the embodiment shown, there is a 90° angle between the axes 24A and 24B and these axes intersect the longitudinal axis 14 of the tubular body 12 at an angle of 45°.

The joint connector 10 is a symmetrical connector with respect to the primary member 12 but in many applications one of the secondary members may intersect the primary member at a 90° angle with a second secondary member intersecting at an angle in the included right angle therebetween.

In order to further strengthen the joint connector 10 the tubular body 12 is provided with thickened wall sections 38 (FIG. 1) outside surfaces of these and other thickened wall sections from a pair of planar side faces 40 which are parallel to the central longitudinal plane represented by the line 2—2 in FIG. 1. This arrangement provides for gussets 42 on opposite sides of the longitudinal center plane (line 2—2, FIG. 1) in the regions between the primary tubular body 12 and the intersecting secondary tubular sections 22A and 22B as best shown in FIG. 1.

In the welded configurations of the prior art, the stress concentrations are extremely heavy in the areas of the weld and often times it was believed that premature failure of welded joint connectors occurred because of the reasons heretofore mentioned producing internal stresses remaining after the welding was completed. In the forged metal construction of the joint connector 10, no such stress areas are developed and the thickened gusset sections 42 provide for a better distribution and spreading of the externally applied stresses so that critical stress values are normally not encountered even though fatigue factors are factors of importance in design. The gusset portions 42 are rounded at opposite ends as shown in FIG. 2 by the numeral 44 and further reduce the stress in the joint connector. The radius of the gussets is normally at least equal to the wall thickness of the end sections 18 of the primary tubular body 12.

As best shown in FIG. 2, the inside surfaces of the secondary tubular members 22A and 22B are terminated by the thickened wall section 32 and the web section 34. In addition, the gussets 42 and 44 provide for additional strength and gussets 46 between the diverging outer surfaces of the secondary tubular members 22A and 22B provide for yet more additional strength for the joint connector.

Referring to FIGS. 3 and 4, therein is illustrated a component 50 for a joint connector in accordance with another embodiment of the invention, said component being adapted to fit into a window or slot in the wall of a relatively large diameter tubular primary member 52 shown in dotted lines. The component can also be attached to the large tubular member as a saddle on the outer surface, thus not requiring a window to be cut in the wall. In both cases the body of the component is welded in place onto the wall of the tubular member.

The component 50 includes a base or body 54 having an outer surface 56 with substantially the same radius of curvature as the outer surface of the primary member 52. The body 54 is formed with beveled opposite end surfaces 58 and is adapted to be welded into place in a suitably dimensioned window or opening in the wall of the enlarged primary tubular member. The body includes a planar inside face 60 and a pair of parallel longitudinal edge faces 62. In the case of a saddle application, the inside face is curved to conform to the outside radius of the tubular primary member 52. As shown, the base includes a relatively thick wall section 64 having passages 64A and 64B formed therein for purposes of internal fluid communication between the interior of the primary member 52 and a pair of tubular secondary members 66A and 66B. The tubular secondary members include a longitudinal central axes 68A and 68B which are on a common plane represented by the section lines 4—4 of FIG. 3 and intersect one another at a point 70 (FIG. 4) spaced on one side (the inside) of the primary tubular member 52 toward the side of junction between the primary and secondary members. As shown in FIGS. 3 and 4, the point of intersection 70 is inside of the longitudinal axis 74 (FIG. 3) of the primary tubular member 52 as represented by the intersection of a projection line 72 from the point 70 to intersect the section lines 4—4 on FIG. 3. The component 50, when welded in place onto the primary tubular member 52, provides a joint connector having negative eccentricity as previously defined herein.

The component 50 is utilized where large diameter tubular members are needed and where size and weight are considerable factors in the use of the connector. The axes 68A and 68B may intersect the longitudinal axis 74 of the primary tubular member 52 at different angles (for example 45° and 90° as shown and known as an "L" brace and the tubular secondary member 66A and 66B also intersect one another outwardly of the body 54 in a thickened web 76 normal thereto. Outer end portions of the tubular secondary members 66A and 66B are cylindrical in shape which frustroconically beveled outer ends 77A and 77B for welding to braces and the like. Points and areas of intersection between the external surfaces of the body and the secondary tubular members are formed with gussets 78 having radii "R" and points and areas of intersection between internal surfaces may have gussets of similar or different radii.

As in the previously described embodiment, the gussets reduce stress concentration. The component 50 is formed with planar, parallel opposite side faces 80 and accordingly, thick wall portions are formed between the intersecting secondary tubular members 66A and 66B on opposite sides of the thickened web 76.

It will thus be seen that the component 50 which is forged from a steel billet like the previously mentioned embodiment provides the advantages of negative eccentricity and lightness in weight and reduced size for easier handling. By the use of the forging method in forming the component, the difficulties heretofore obtaining with castings or welding in areas of stress concentration are eliminated. The component 50 can be installed in sites by insertion into a properly dimensioned window or opening provided in the tubular primary member 52, or may be saddled in place on the outer surface of the wall thereof. In either case, the welding used in attaching the component 50 to the primary tubular member 52 is in areas of reduced stress, namely adjacent the opposite end surfaces 58 and the side edge surfaces 62 of the body 54.

Although the present invention has been described with reference to the illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A forged steel structural connector for tubular members in a truss, comprising:
    a one-piece forged steel element having a body member of approximately uniform wall thickness constituting at least a curved portion of a tubular primary member having a longitudinal central axis, and first and second tubular secondary members;
    each of said secondary members having a longitudinal central axis coplanar with said axis of said primary member and each being integrally connected to said body member by forging said secondary members to a first side of said primary member and to each other to provide an overlapping joint between said secondary members and to provide a web having a wall thickness greater than said approximately uniform thickness of said body member, said web being formed by said forging and extending outwarding from said primary member and between said secondary members;
    said primary member having a second side, the distance between said first and second sides of said primary member defining the thickness thereof where said primary member is connected to said secondary members, said thickness being greater than said approximately uniform thickness of said body member and being caused by the forging of said body member;
    said axes of said secondary members intersecting each other at a point between said axis of said primary member and said first side of said primary member to provide a joint of negative eccentricity between said secondary members and said primary member, the distance between said axis of said primary member and said point of intersection being greater than the distance between said point of intersection and said second side of said primary member.

2. The element of claim 1 wherein said body member is a tubular primary member.

3. The element of claim 2 in which said intersection point is located between said first and second sides of said primary member.

4. The element of claim 3 further including planar, reinforcing surfaces located on the exterior of said body member and secondary members, said planar surfaces being parallel to each other and to the plane comprising said primary and secondary axes.

5. The element of claim 4 in which the ends of said body and secondary members thereof are adapted to be connected to tubular structures.

6. The element of claim 2 further including planar, reinforcing surfaces located on the exterior of said body member and secondary members, said planar surfaces being parallel to each other and to the plane comprising said primary and secondary axes.

7. The element of claim 6 in which the ends of said body and secondary members thereof are adapted to be connected to tubular structures.

* * * * *